June 8, 1943.  D. T. RYAN  2,321,159
FOOTBALL GOGGLES
Filed Jan. 8, 1940
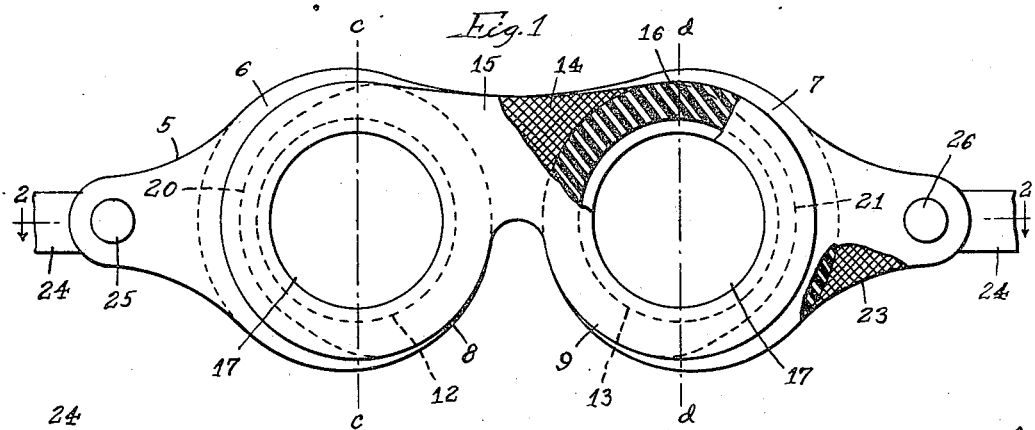
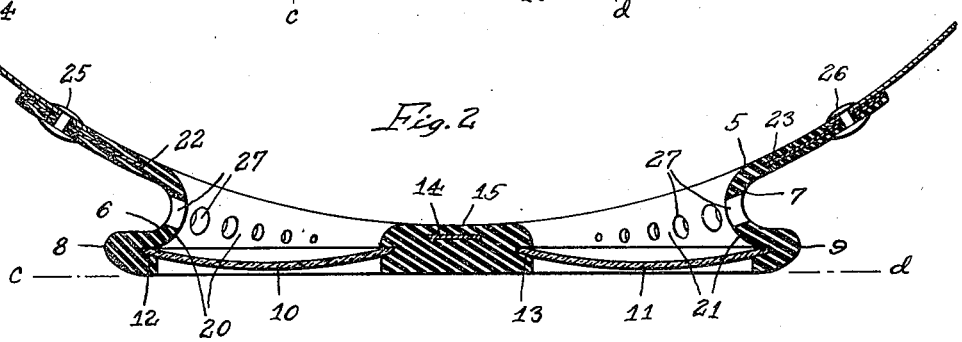
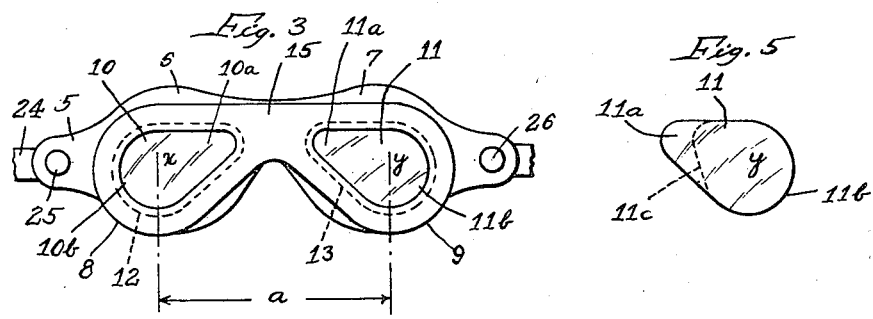
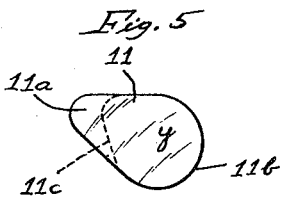
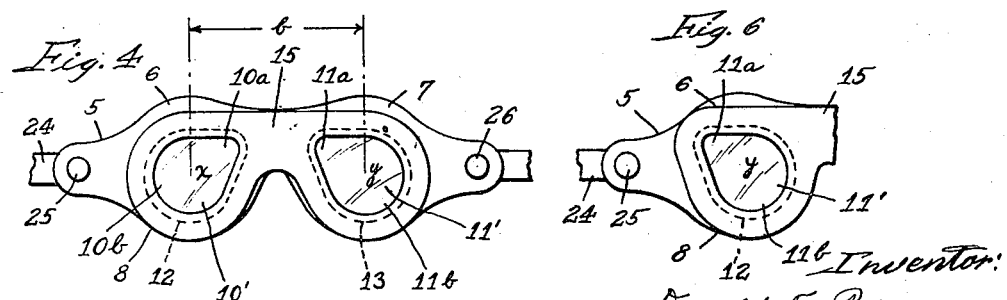
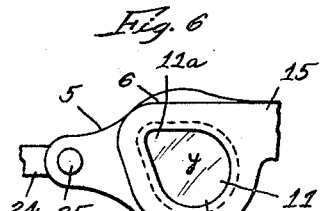
Inventor:
Donald T. Ryan
By
McCanna, Wintercorn & Morebach
Attys.

Patented June 8, 1943

2,321,159

UNITED STATES PATENT OFFICE 2,321,159

FOOTBALL GOGGLES

Donald T. Ryan, Beloit, Wis.

Application January 8, 1940, Serial No. 312,877

8 Claims. (Cl. 88—41)

This invention relates to improvements in goggles designed to mount unbreakable prescription lenses and otherwise stand rough usage, so as to be adapted for use in sports such as football, hockey, and soccer by athletes whose defective vision would not permit their participation in these sports without such air.

The principal object of my invention is to provide goggles having sufficient rigidity to hold the unbreakable lenses securely in proper relation to the eyes while having sufficient flexibility and cushioning action to withstand the shocks and contacts incident to a sport such as football, the goggles being further designed so that the hazard of scratching the lenses is reduced to a minimum.

Another important object of the invention is to provide a goggle frame of one size which upon insertion of the proper sized lenses will fit practically any potential user within a wide range regardless of differences in pupillary measurement. This enables quick, accurate and economical fitting, for all the information that is required with an order for goggles for a certain player is the pupillary distance and the prescribed correction for each eye.

The invention is illustrated in the accompanying drawing, wherein—

Fig. 1 is a front elevation of the goggle frame without the lenses, showing certain portions in section for purposes of better illustration;

Fig. 2 is a longitudinal section of the goggles, complete with lenses, taken on the line 2—2 of Fig. 1;

Fig. 3 is a front elevation of Fig. 2, on a smaller scale;

Fig. 4 is a similar view showing the same goggle frame but fitted with smaller lenses as required for a smaller pupillary measurement, the two extremes being indicated by the pupillary dimensions $a$ and $b$, respectively;

Fig. 5 is a lens diagram, and

Fig. 6 is a fragmentary front view illustrating the possibility of reversing the lenses in the frame end for end in cases of small pupillary measurement.

The same reference numerals are applied to corresponding parts in the drawing.

The frame of this goggles is of a one-piece molded rubber construction consisting of a backing 5 containing two eye openings defined by two lens cups or pockets 6—7, and lens retainer rims 8—9. Corrective lenses 10—11 of suitable unbreakable plastic material, are held in annular grooves 12—13 which are molded in the lens retainer rims 8—9, respectively. A stiff webbing or fabric is molded in place in the frame of the goggles at strategic points. One portion 14 of this fabric is contained within the backing 5 at the middle bridge portion 15 and extends on either side, as illustrated in Fig. 1, to a point 16 near a line corresponding to a vertical center axis through the circular sight opening 17 in each lens retainer. The presence of the fabric 14 makes this middle portion of the goggles relatively rigid with respect to the other portions but of sufficient flexibility to withstand any blow or contact encountered in a sport such as football, without injuring the wearer or damaging the goggles. The bridge portion 15 is purposely made as thick as possible to give strength to this portion where the greatest strains come in the use of the goggles and there is sufficient body thickness so that a player may, if he so desires, whittle away some of the rubber to make the goggles fit more comfortably, without seriously weakening the frame. As clearly appears in Fig. 2, the bridge portion 15 is equal in thickness to the inner end portions of the lens pockets 6—7. This thickness is carried out approximately to the middle of the top and bottom of the lens-retaining rims 8 and 9, that is, to the lines $c$—$c$ and $d$—$d$ in Fig. 1, thus materially strengthening the goggle frame without interfering with the stretching of the rims 8—9, as hereinafter described, to accommodate different sized lenses.

My invention, as previously indicated, contemplates provisions for fitting corrective lenses and it is, therefore, essential to maintain the approximate coplanar relationship of the lenses in order to give the wearer correct vision. The stiffened middle portion 15, previously mentioned, and the tapered form of the lens pockets 6—7 in horizontal section, illustrated in Fig. 2, serve to maintain the coplanar relationship and yet provide for the required flexibility. The backing 5 conforms itself nicely to the rounding of the head, as appears in Fig. 2.

The possibility of scratching the outer surfaces of the lenses 10—11 is reduced to a minimum by the novel construction of the rims 8—9 in which the grooves 12—13 hold the lenses in depressed relation back of the plane of the flat front face of the rims, as indicated by line $c$—$d$ in Fig. 2. The walls 20—21 of the lens pockets 6—7 extending outwardly from the middle bridge piece 15 are limber enough to yield in the event the lens-retaining rims 8—9 come into forcible contact with anything, thus protecting the lenses 10—11 as well as relieving the wearer of a certain amount of the shock incident to such contacts.

In accordance with an important object of my invention, I provide the lenses 10—11 of what is known to the trade as leaf or drop form, and by varying the extent to which the apex portions 10a—11a of these lenses project from the pupillary center points x—y with respect to which the generally circular portions 10b—11b of the lenses are substantially concentric, I am enabled to utilize the one standard sized goggle frame for any one of a large number of individuals within a wide range, regardless of differences in pupillary measurement, the rims 8—9 being stretchable enough to permit insertion of lenses 10—11 for the one extreme pupillary measurement a, as shown in Fig. 3, and still require sufficient stretching when other lenses 10'—11' for the other extreme pupillary measurement b, indicated in Fig. 4, are inserted to insure secure holding of said lenses. Fig. 5 illustrates by the dotted line 11c the difference in length of the apex portions 11a of the two extremes illustrated in Figs. 3 and 4, the pupillary center point y being common to the two extremes. It is obvious that the stretching of the rims 8—9 coupled with the fact that the lenses are non-circular eliminates danger of the lenses turning and ruining their corrective value by the change in the position of their axes. The rubber of which the goggle frame is molded also has a high coefficient of friction, and any tendency for the lenses to shift from a set position is accordingly further reduced. It will be observed in Figs. 3 and 4 that the distortion of the goggle frame incident to stretching of the rim portions 8 and 9 is mainly in the outer halves of the pockets 6—7 remote from the middle bridge portion 15, namely, to the left of the axis c—c and to the right of the axis d—d in Fig. 1, these axes passing through the centers of the circular sight openings 17. In that way, the goggle frame maintains very nearly the same shape through the bridge portion 15 even under the extreme conditions described and will fit reasonably well on all players. I may reverse the lenses end for end in cases of small pupillary measurement, as indicated in Fig. 6, placing the apex portion 11a outermost and the other portion 11b innermost, because it is thought that such reversal may enlarge the field of vision.

Stiff fabric or webbing 22—23 is molded in place in the ends of the backing 5 and acts to reinforce these tab parts of the goggle frame for the attachment of an adjustable head band 24 by rivets 25—26.

Perforations, designated by the number 21, permit air to circulate within the lens pockets 6—7, thus contributing to the comfort of the wearer by preventing clouding of the lenses through condensation.

It is believed the foregoing description conveys a good understanding of the objects and advantages of my invention. The appended claims are drawn with a view to covering all legitimate modifications and adaptations.

I claim:

1. Goggles for use by players in sports such as football, comprising a relatively thick, one-piece molded rubber lens-holding frame providing relatively thinner walled lens pockets of slightly elastic rubber joined integrally by a relatively thicker distortion resisting bridge portion, the thinner walls of said lens pockets defining lens-retaining rim portions of enlarged outside dimensions with internal annular grooves provided therein to receive the lenses, the bridge portion being of inverted generally triangular form filling the space between the upper halves of the lens-retaining rim portions and being of increased thickness so that the front and back surfaces of the bridge portion are substantially flush with the front and back surfaces of the rim portions, the bridge portion serving to resist displacement of the lens pockets from substantially coplanar relation, the rim portions being stretchable away from the bridge portion substantially without distortion in shape or size of said bridge portion, and shatter-resistant lenses frictionally gripped in said grooves under the contractive pressure of the stretched rim portions.

2. Goggles for use by players in sports such as football, comprising a relatively thick, one-piece molded rubber lens-holding frame providing relatively thinner walled lens pockets of slightly elastic rubber joined integrally by a relatively thicker distortion resisting bridge portion, the thinner walls of said lens pockets defining lens-retaining rim portions of enlarged outside dimensions with internal annular grooves provided therein to receive the lenses, the bridge portion being of inverted generally triangular form filling the space between the upper halves of the lens-retaining rim portions and being of increased thickness so that the front and back surfaces of the bridge portion are substantially flush with the front and back surfaces of the rim portions, the bridge portion serving to resist displacement of the lens pockets from substantially coplanar relation, the rim portions being stretchable away from the bridge portion substantially without distortion in shape or size of said bridge portion, and shatter-resistant prescription lenses of non-circular form non-rotatably mounted in said grooves and frictionally gripped under the contractive pressure of the stretched rim portions.

3. Goggles for use by players in sports such as football, comprising a relatively thick, one-piece molded rubber lens-holding frame providing relatively thinner walled lens pockets of slightly elastic rubber joined integrally by a relatively thicker distortion resisting bridge portion, the thinner walls of said lens pockets defining lens-retaining rim portions of enlarged outside dimensions with internal annular grooves provided therein to receive the lenses, the bridge portion being of inverted generally triangular form filling the space between the upper halves of the lens-retaining rim portions and being of increased thickness so that the front and back surfaces of the bridge portion are substantially flush with the front and back surfaces of the rim portions, the bridge portion serving to resist displacement of the lens pockets from substantially coplanar relation, the rim portions being stretchable away from the bridge portion substantially without distortion in shape or size of said bridge portion, and shatter-resistant prescription lenses mounted in said grooves and frictionally gripped under the contractive pressure of the stretched rim portions, said lenses being drop-shaped so as to prevent rotation, and the apex portions of said lenses extending in opposite directions along the same substantially horizontal axis and elongated relative to the remaining portions of said lenses to provide the desired spacing of the pupillary centers of said lenses.

4. Goggles for use by players in sports such as football, comprising a goggle frame of one-piece molded rubber construction providing substantially circular lens pockets and a connecting integral bridge portion, the pocket portions being of tapered horizontal section widening outwardly from the bridge portion and the front lens-holding rim portions of said pockets being disposed in substantially coplanar relation with the bridge portion, the rim portions of said pockets being of enlarged outside dimensions and having substantially coplanar internal annular grooves provided therein adapted to receive shatter-resistant lenses, the bridge portion being of inverted generally triangular form filling the space between the upper halves of the pocket rim portions and being of increased thickness so that the front and back surfaces of the bridge portion are substantially flush with the front and back surfaces of the rim portions, the bridge portion serving to resist displacement of the rim portions from substantially coplanar relation, said frame having thinner easily flexible tabs projecting from the ends thereof conformable to the head of the wearer.

5. Goggles as set forth in claim 4, wherein the lens pocket portions have the side walls thereof of reduced thickness radially in the outer halves remote from the bridge portion for increased flexibility and stretchability of these portions, the inner halves having the walls thereof of substantially increased thickness radially and the bridge portion being of substantially the same transverse thickness as the inner end portions of the lens pocket portions for increased strength and rigidity.

6. Goggles as described in claim 4, wherein the lens-receiving grooves are spaced rearwardly from the plane of the flat front face of the rims far enough so that convex lenses mounted in said grooves are disposed wholly behind and spaced from said plane.

7. Goggles as set forth in claim 2, wherein the prescription lenses of shatter-resistant material are substantially drop-shaped and demountably supported in said rim portions to permit substitution of another pair of similarly shaped lenses, the lenses of different pairs usable interchangeably in said rim portions differing in width according to difference in elongation of the apex portions but having the pupillary centers substantially coinciding with one another.

8. Goggles as set forth in claim 1, wherein the lens receiving grooves are spaced rearwardly from the plane of the front of the rim portions far enough so that convex lenses mounted in said grooves are disposed wholly behind and spaced from said plane.

DONALD T. RYAN.